UNITED STATES PATENT OFFICE.

OSCAR GÜNTHER AND LEOPOLD HESSE, OF ELBERFELD, AND ARTHUR ZART, OF VOH-WINKEL, GERMANY, ASSIGNORS TO FARBENFABRIKEN VORM. FRIEDR. BAYER & CO., OF ELBERFELD, GERMANY, A CORPORATION OF GERMANY.

DYE.

978,580.  Specification of Letters Patent.  Patented Dec. 13, 1910.

No Drawing.  Application filed May 11, 1910.  Serial No. 560,687.

*To all whom it may concern:*

Be it known that we, OSCAR GÜNTHER, LEOPOLD HESSE, and ARTHUR ZART, doctors of philosophy, chemists, citizens of the German Empire, residing, respectively, at Freyastrasse 77, Elberfeld; Boltenbergstrasse 32, Elberfeld, and Yorkstrasse 18, Vohwinkel, near Elberfeld, Germany, have invented new and useful Improvements in Dyes, of which the following is a specification.

Our invention relates to the manufacture and production of new azo dyestuffs dyeing unmordanted cotton from orange to red to brown shades fast to light.

The process for their production consists in transforming sulfonic acids of aminodisazo compounds into the symmetrical diarylurea compounds by treatment with phosgen. The new dyes are after being dried and pulverized in the shape of their alkalin salts dark powders soluble in concentrated sulfuric acid with a violet-blue to greenish-blue color. Upon reduction with stannous chlorid and hydrochloric acid an aminosulfonic acid, a diamin derivative, and the urea of a diamin derivative are obtained which latter substance is further decomposed into carbonic acid and the corresponding diamin derivative by the action of the acid.

To illustrate our process we can proceed as follows, the parts being by weight:—

1098 parts of the disodium salt of the aminodisazo dyestuff: para-aminobenzene sulfonic acid + ortho-aminobenzene sulfonic acid + cresidin are dissolved in 2000 parts of water. Into this solution which has to be kept alkalin during the whole reaction phosgen is introduced while stirring until the production of the urea is complete. The new dye is salted out, filtered off and dried. It is after being dried and pulverized in the shape of its sodium salt a dark powder soluble in water with an orange-red color and soluble in concentrated sulfuric acid with a blue color; yielding upon reduction with stannous chlorid and hydrochloric acid para-aminobenzene sulfonic acid, para-phenylenediamin sulfonic acid and the urea of amino-cresidin which is further decomposed into amino-cresidin and carbonic acid. It dyes cotton yellowish-red shades fast to light.

Other dyestuffs belong to the above mentioned class may be used *e. g.* dyes containing instead of para-sulfanilic acid as first components meta-sulfanilic acid, ortho-anisidin-para-sulfanilic acid $$C_6H_3(OCH_3:NH_2:SO_3H)=1:2:4,$$

sulfoanthranilic acid $$C_6H_3(NH_2:COOH:SO_3H)=1:2:4,$$

2-naphthylamin-4.6-disulfonic acid, 1.2-amino-naphthol-ether-6-sulfonic acid etc., or dyes containing instead of ortho-sulfanilic acid other middle components, such as 1-naphthylamin-6- or 7-sulfonic acid, 1.2-aminonaphthol-ether-6-sulfonic acid, anilin, cresidin, 1-naphthylamin, etc. Furthermore other suitable end components may be used.

We claim:—

1. The herein described new dyestuffs being ureas of sulfonic acids of aminodisazo compounds, which dyes are after being dried and pulverized in the shape of their alkalin salts dark powders soluble in concentrated sulfuric acid with a violet-blue to greenish-blue color; yielding upon reduction with stannous chlorid and hydrochloric acid an aminosulfonic acid, a diamin and an urea of a diamin which is further decomposed into carboxylic acid and a diamin; dyeing cotton from yellow to red to brown shades, substantially as described.

2. The herein described new dyestuff being the urea of the disazo coloring matter: para-aminobenzene sulfonic acid + ortho-aminobenzene sulfonic acid + cresidin, which is after being dried and pulverized in the shape of its sodium salt a dark powder soluble in water with an orange-red color and soluble in concentrated sulfuric acid with a blue color; yielding upon reduction with stannous chlorid and hydrochloric acid para-aminobenzene sulfonic acid, para-phenylenediamin sulfonic acid and the urea of amino-cresidin, which is further decomposed into aminocresidin and carboxylic acid; dyeing cotton yellowish-red shades fast to light; substantially as described.

In testimony whereof we have hereunto set our hands in the presence of two subscribing witnesses.

OSCAR GÜNTHER. [L. S.]
LEOPOLD HESSE. [L. S.]
ARTHUR ZART. [L. S.]

Witnesses:
OTTO KÖNIG,
CHAS. J. WRIGHT.

It is hereby certified that in Letters Patent No. 978,580, granted December 13, 1910, upon the application of Oscar Günther and Leopold Hesse, of Elberfeld, and Arthur Zart, of Vohwinkel, Germany, for an improvement in "Dyes," an error appears in the printed specification requiring correction as follows: Line 52, the word "belong" should read *belonging;* and that the said Letters Patent should be read with this correction therein that the same may conform to the record of the case in the Patent Office.

Signed and sealed this 7th day of February, A. D., 1911.

[SEAL.]
C. C. BILLINGS,
*Acting Commissioner of Patents.*